(12) United States Patent
Agarwal et al.

(10) Patent No.: US 9,785,172 B2
(45) Date of Patent: Oct. 10, 2017

(54) SWITCHED CAPACITOR DC-DC CONVERTER BASED DISTRIBUTED MAXIMUM POWER POINT TRACKING OF PARTIALLY SHADED PHOTOVOLTAIC ARRAYS

(71) Applicant: Indian Institute of Technology Bombay, Mumbai (IN)

(72) Inventors: Vivek Agarwal, Mumbai (IN); Pradeep Kuruvilla Peter, Bangalore (IN)

(73) Assignee: Indian Institue of Technology Bombay, Mumbai (IN)

( * ) Notice: Subject to any disclaimer, the term of this patent is extended or adjusted under 35 U.S.C. 154(b) by 367 days.

(21) Appl. No.: 14/407,890

(22) PCT Filed: Jun. 10, 2013

(86) PCT No.: PCT/IN2013/000366
§ 371 (c)(1),
(2) Date: Dec. 12, 2014

(87) PCT Pub. No.: WO2013/186791
PCT Pub. Date: Dec. 19, 2013

(65) Prior Publication Data
US 2015/0137607 A1    May 21, 2015

(30) Foreign Application Priority Data
Jun. 13, 2012   (IN) .......................... 1715/MUM/2012

(51) Int. Cl.
*H02J 1/00*    (2006.01)
*G05F 1/67*    (2006.01)
(Continued)

(52) U.S. Cl.
CPC .................. *G05F 1/67* (2013.01); *H02J 1/00* (2013.01); *H02M 3/07* (2013.01); *H02M 3/156* (2013.01);
(Continued)

(58) Field of Classification Search
CPC ... G05F 1/67; H02J 1/00; H02J 3/383; H02M 3/07; H02M 3/156; Y10T 307/685; Y10T 307/707; Y02E 10/563
(Continued)

(56) References Cited

U.S. PATENT DOCUMENTS

| | | | |
|---|---|---|---|
| 2012/0043923 A1* | 2/2012 | Ikriannikov | H02J 1/10 320/103 |
| 2012/0223583 A1* | 9/2012 | Cooley | H02J 3/385 307/82 |

* cited by examiner

Primary Examiner — Hal Kaplan

(57) ABSTRACT

A method and system for implementing DMPP tracking of partially shaded/uniformly illuminated photovoltaic arrays using switched capacitor DC-DC converter is disclosed. Here, a dedicated SC converter is connected across each PV cell or PV module made of series connected PV cells wherein series connected modules make a PV string and parallel connected PV strings make up a PV array. This SC converter injects an equalization current across the PV module or PV cell so that the total current in the parallel combination of the PV module or PV cell and the corresponding SC converter is the same as the PV string current. In another implementation of DMPP tracking using SC converters, a dedicated SC converter is connected across each isolated PV module to perform MPP tracking of the respective PV module. Then all MPP tracking SC converter outputs are diode ORed to the common load.

5 Claims, 14 Drawing Sheets

(51) Int. Cl.
  *H02M 3/07* (2006.01)
  *H02M 3/156* (2006.01)
  *H02J 3/38* (2006.01)

(52) U.S. Cl.
  CPC ............. *H02J 3/383* (2013.01); *Y02E 10/563* (2013.01); *Y10T 307/685* (2015.04); *Y10T 307/707* (2015.04)

(58) Field of Classification Search
  USPC .................................................... 307/77, 82
  See application file for complete search history.

PV cell integrated current
equalization SC converter.
$C_T$ and $C_O$ may be external

SWITCHED CAPACITOR DC-DC CONVERTER BASED DISTRIBUTED MAXIMUM POWER POINT TRACKING OF PARTIALLY SHADED PHOTOVOLTAIC ARRAYS

PRIORITY DETAILS

The present application is a National Phase Application for PCT application no. PCT/IN2013/000366 filed on 10 Jun. 2013 based on and claims priority from IN Applications bearing No. 1715/MUM/2012 Filed on 13 Jun. 2012, the disclosure of which is hereby incorporated by reference herein

FIELD OF INVENTION

This embodiment relates to photovoltaic arrays, and more particularly to the implementation of distributed maximum power point tracking of photovoltaic arrays using switched capacitor (SC) DC-DC converters.

BACKGROUND OF INVENTION

Certain materials exhibit a property known as the photoelectric effect that causes them to absorb photons of light and release electrons. When these free electrons are captured, electric current results. Photovoltaic (PV) power generation employs solar panels composed of a number of solar cells containing a PV material. Materials presently used for PVs comprise of mono crystalline silicon, polycrystalline silicon, amorphous silicon, cadmium telluride, and copper indium gallium selenide/sulfide. Due to the growing demand for renewable energy sources, the manufacturing of solar cells and PV arrays has advanced considerably in recent years. Further, driven by advances in technology and increases in manufacturing scale and sophistication, the cost of PV has declined steadily since the first solar cells were manufactured.

When more power is required than a single cell can deliver, cells are electrically connected together to form PV modules or solar panels. A single module is sufficient to power an emergency telephone, but for a house or a power plant, the modules must be arranged in multiple arrays.

PV cells require protection from the environment and are usually packaged tightly behind a glass sheet. The possibility of partial shading of PV arrays in terrestrial applications due to shadows of buildings, trees and clouds is a distinct reality. The un-shaded parts of a solar array will be illuminated more than the shaded regions of the array. The lowering of the intensity of solar illumination on the shaded solar cells causes a reduction in the overall power generation from a PV source. The short circuit current, $S_{ic}$ reduces significantly during shading whereas the open circuit voltage $V_{oc}$ does not change much. The other factors leading to the mismatch in characteristics of PV modules are temperature differences between the PV modules and manufacturing tolerances.

Interconnecting individual PV modules in series causes their voltages to add up while the current remains the same in all the modules. During partial shading conditions, this forces the PV modules generating lower current to operate in the reverse biased region of the Current-Voltage (I-V) characteristics which leads to large thermal dissipation and eventual module/cell damage. To prevent this, module bypass diodes are connected in parallel with each module. They conduct before the PV cells of a particular module get reverse biased and thereby prevent damage due to thermal runaway. When the bypass diodes conduct, power from the entire module is lost since the PV module voltage is clamped to the drop across the forward biased bypass diode. The PV array's Power-Voltage (P-V) curve shows multiple peaks and the overall power output of the PV array (source) decreases drastically. Under these circumstances, some of the popular Maximum Power Point (MPP) tracking algorithms require appropriate modifications to bypass the unwanted local maxima and bring the operating point close to the global MPP thereby increasing the complexity of the MPP tracking scheme.

Maximum power point trackers may implement different algorithms and switch between them based on the operating conditions of the array. MPP algorithms are necessary because PV arrays have a non-linear voltage-current characteristic with a unique point where the power produced is maximum. This point depends on the temperature of the panels and on the irradiance conditions. Both conditions change continuously during the day and are also different depending upon the season of the year. Furthermore, irradiation can change rapidly due to changing atmospheric conditions such as clouds. It is very important to track the MPP accurately under all possible conditions so that the maximum available power is always obtained.

One of the prominent MPP tracking scheme is the Distributed Maximum Power Point (DMPP) tracking scheme. DMPP is an MPP scheme that has a dedicated MPP tracker for each PV module or for each PV cell as opposed to a centralized MPP tracker for the entire PV array. A DMPP tracking scheme does away with the need for module bypass diodes. They are effective during situations of uniform illumination of all PV modules as well as during partial shading of some modules. In some schemes of DMPP tracking, the PV modules are isolated from each other. A dedicated MPP tracker realized with a non-isolated conventional DC-DC converter of either buck, boost or buck-boost topology is associated with each PV module. The outputs of these MPP trackers are usually connected in series to form a DC bus. Since an MPP tracker is dedicated to each PV module, each tracker can independently optimize the power flow from its source. A single partially shaded PV module can deliver a reduced power rather than being bypassed by a diode. The dedicated MPP tracking DC-DC converters may even be integrated into the PV modules to form a compact unit.

However, there are limitations to this scheme. The output current of the series connected MPP trackers must be equal. During partial shading of some PV modules, the current from these modules are lower than that of the well illuminated modules. Depending on the difference in the illumination of the series connected modules, the voltage requirements of the subsequent stages and the topology of the MPP tracker, there are situations where some partially illuminated PV modules may not deliver the full power that they are capable of generating. In another scheme for DMPP tracking, a DC-DC converter that is dedicated to each series connected PV module injects an equalization current across the PV module across which it is connected while maintaining the module voltage at the maximum power point. Here the partially shaded modules can deliver the full power that they are capable of generating irrespective of the illumination it receives.

In a currently existing system, the PV module current equalization scheme is described as "generation control circuit". In one method, based on an isolated multi output DC-DC converter, precise module voltage and equalization current control is not possible.

In another existing method, a multi stage chopper is used with accurate control of the module voltage and equalization current. The disadvantage with the multi stage chopper is the lack of modularity since modules cannot be added or removed without adjustments in the design. Previous approaches make use of an isolated fly back converter for current equalization. A method of current equalization in series connected PV modules with a non-isolated bidirectional DC-DC converter of buck-boost or Cuk topology for each adjacent PV panel pair can shuffle power up or down the PV array.

Conventional DC-DC converters that make use of magnetics have been used for DMPP tracking schemes earlier. These DC-DC converters comprise of power handling inductors and transformers which result in low power densities and high realization cost.

In an existing method of maximum power point tracking, a DC-DC converter is connected across a solar array and is used as a maximum power point tracker to supply power to a DC-AC inverter or a DC load. The limitation of this method is that it makes use of conventional DC-DC converters which result in low power densities and high realization cost. In another existing method of maximum power point tracking, a pulse powered super capacitor is electrically connected between a photo voltaic panel and a DC-DC converter. The super capacitor with low internal resistance and fast response, serves as a steady state input/output energy storing device. The disadvantage of this method is that it is not ideal for integration with each PV module.

SC DC-DC converters accomplish power conversion with the help of capacitors that are electronically switched between the input power source and the output load. The most distinguishing feature of SC converters is the complete absence of power handling inductors and transformers leading to high power densities of up to 23 W/in$^3$ and low realization cost. SC converters with efficiencies in excess of 95% have been realized under certain operating conditions. Hence, they are ideal for integration with the PV module and PV cell. Since, they do not require any form of tuning, they are ideal for large-scale production.

OBJECT OF INVENTION

The principal object of this embodiment is to implement DMPP tracking schemes using SC DC-DC converters for partially shaded PV arrays. SC converter based DMPP tracking is equally effective for uniformly illuminated PV arrays as well.

The use of SC converters for implementing DMPP tracking of PV arrays is demonstrated with two methods. In the first method, a dedicated SC converter is connected across each PV module in a PV string made of series connected PV modules. Strings may be paralleled to form a PV array. This SC converter injects equalization currents across the PV module such that the total current that flows through the parallel combination of each PV module and the corresponding SC converter is the same. The SC converter also maintains the PV voltage at its MPP voltage. This concept may be extended further to the case where an SC converter realized on the same monolithic wafer as the PV cell itself does the DMPP tracking by injecting an equalization current directly across the PV cell.

In the second method to demonstrate the use of SC converters for DMPP tracking of a PV array, a dedicated SC converter is connected across each PV module which is isolated from the other PV modules. The SC converter does the MPP tracking of the respective PV module. All MPP tracking SC converter outputs are diode ORed to the common load.

STATEMENT OF INVENTION

Accordingly the embodiment provides an apparatus for implementing DMPP tracking using SC converters, which is characterized by connecting an SC converter across each PV module in a PV string comprising of series connected PV modules or across each PV cell of the PV module by way of monolithic integration or otherwise. PV strings may be paralleled to form a PV array. The SC converter injects equalization current across the PV module or PV cell such that the total current that flows through the parallel combination of each PV module or PV cell and the corresponding SC converter is the same. The SC converter also maintains the PV module or PV cell voltage at its MPP voltage.

There is also provided an alternate method of DMPP tracking using SC converters in which all the PV modules are isolated. A dedicated SC converter that is connected across each PV module does the MPP tracking of the respective PV module. All the MPP tracking SC converter outputs are diode ORed to the common load.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
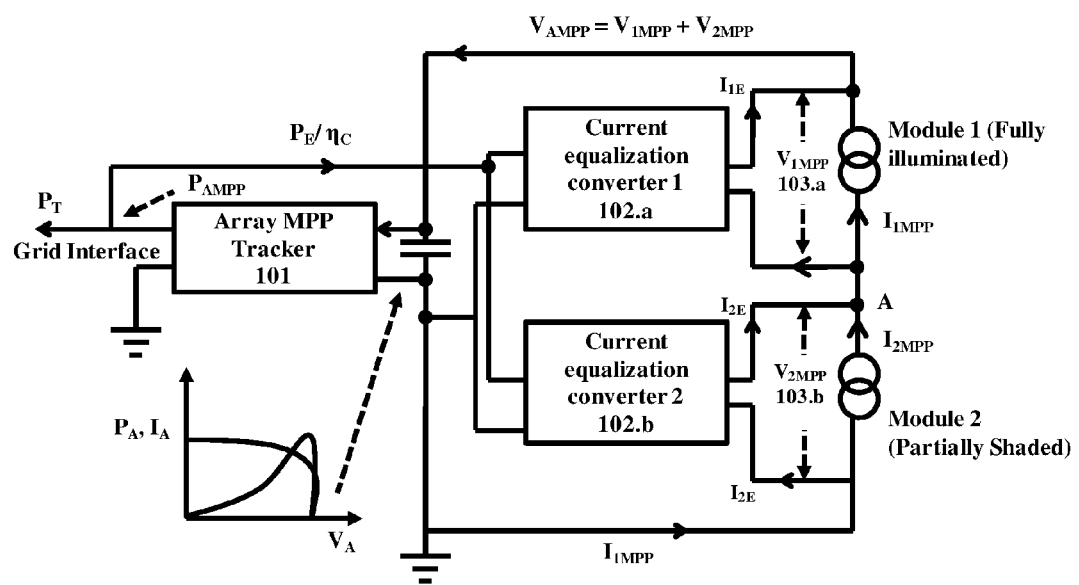
FIG. 1 illustrates a two module PV array with DC-DC converters for current equalization, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a maximum power point tracking of partially shaded photovoltaic arrays by providing a method and system thereof.

Referring now to the drawings, and more particularly to FIGS. 1 through 14, where similar reference characters denote corresponding features consistently throughout the figures, there are shown preferred embodiments.

FIG. 1 illustrates a two module PV array with DC-DC converters for current equalization, as disclosed in the embodiments herein. Consider a PV array made up of two PV modules connected in series as shown in the FIG. It is assumed that module 1 is fully illuminated and module 2 is partially shaded. There are no bypass diodes across the modules as is the case with the PV module dedicated MPP tracker scheme. A ground isolated DC-DC converter 102 is connected across each PV module. The ground isolated DC-DC converter 102 draws power from the output of an Array MPP Tracker 101 and injects an equalization current ($I_{1E}$ or $I_{2E}$) across the respective PV module. The ground isolated DC-DC converter forces the PV module to operate at its MPP by maintaining the voltage across it at its MPP voltage ($V_{1MPP}$ or $V_{2MPP}$).

Consider the MPP current generated by PV module 1 to be $I_{1MPP}$ and that generated by PV module 2 to be $I_{2MPP}$ ( ). Due to partial shading conditions, the current in the PV module 103.b will be lesser than the current in the PV module 103.a, i.e., $I_{1MPP} > I_{2MPP}$. At node A, to satisfy KCL (Kirchhoff's current law), the below equation is represented:

$$I_{2E} = I_{1MPP} - I_{2MPP} + I_{1E} \quad (1)$$

The DC-DC converter operates in such a way that it maintains a voltage $V_{2MPP}$ across module 2 and injects an equalization current $I_{2E}$ given by (1). Thus converter 2 outputs an equalization power:

$$P_{2E} = V_{2MPP} \times I_{2E} \quad (2)$$

The input power of the module 102.b is drawn from the output of the Array MPP tracker 101. The PV module 103.a is fully illuminated and hence the current flowing through the PV module 103.a is its MPP current. Therefore, the current in the PV array is approximately equal to the MPP current of PV module 103.a. The equalization current injected by converter 102 (a) across the PV module 103(a) is $I_{1E} \approx 0$.

Thus in the two module PV array of FIG. 1, the array current is equal to the current of the fully illuminated module 103.a. The current equalization process injects an equalization current across the partially illuminated module 103.b such that the sum of the injected equalization current and the current of the corresponding PV module are equal to the array current.

Hence the equalization power ($P_{E1}$) delivered by converter 1 is almost zero. Thus the total equalization power is $P_E \approx P_{2E}$. Let $P_{AMPP}$ denote the power available at the output of the array MPP tracker whose efficiency is assumed to be unity for simplicity. If the equalization converter's efficiency is $\eta_c$, the total power $P_T$ available after current equalization scheme is:

$$P_T = P_{AMPP} - P_{2E}/\eta_C \quad (3)$$

$$\text{where } P_{AMPP} = V_{AMPP} \times I_{1MPP} \quad (4)$$

$$V_{AMPP} = V_{1MPP} + V_{2MPP} \quad (5)$$

Therefore, irrespective of the amount of partial shading, a module delivers the maximum power it can generate. The current vs. voltage ($I_A$ vs. $V_A$) and Power vs. Voltage ($P_A$ vs. $V_A$) characteristics of the PV array is similar to the characteristics observed during uniform illumination (with a single power peak) irrespective of whether the individual PV modules are partially shaded or uniformly illuminated. Compared to existing tracking schemes for partially shaded PV arrays, the process of the array MPP tracker running a MPP tracking algorithm to track the PV array's MPP is simpler.

Figure 2:
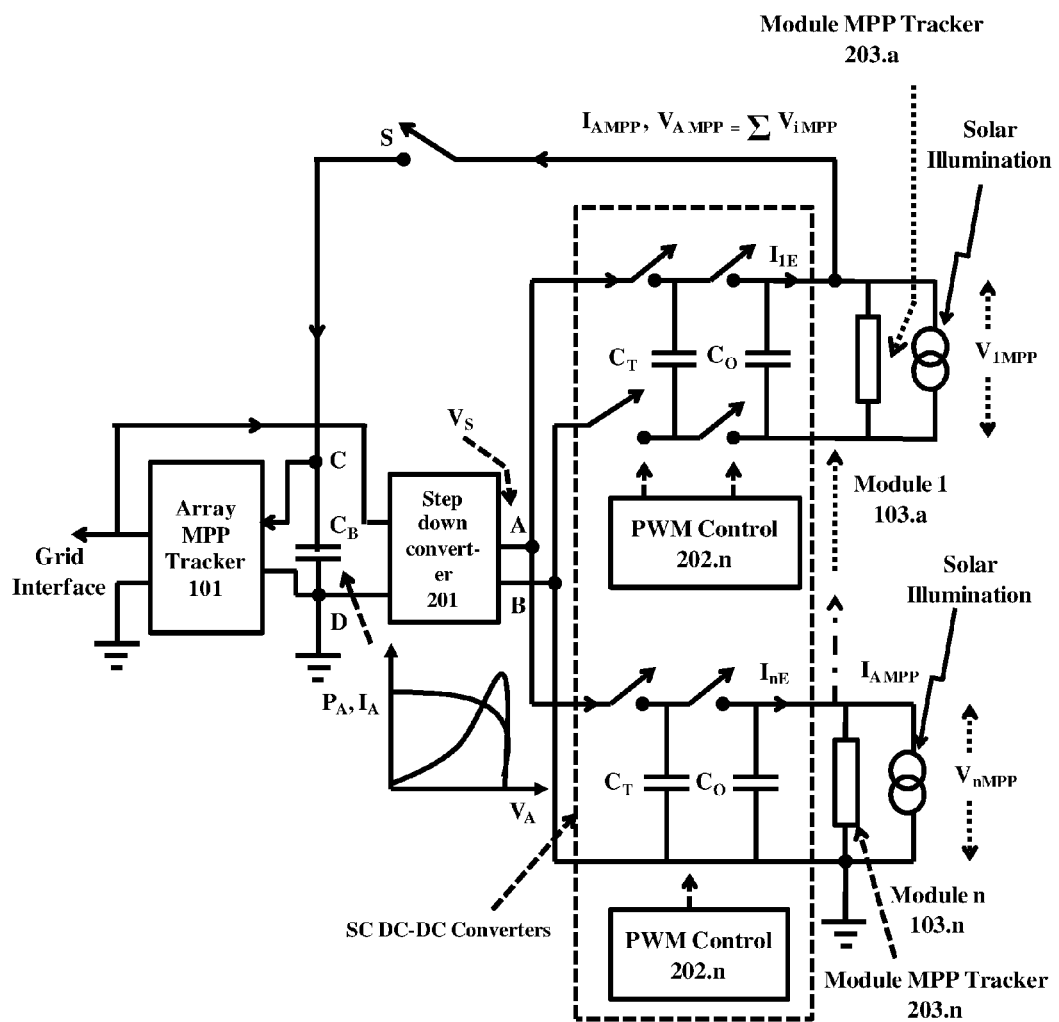
FIG. 2 illustrates a current equalization scheme of a PV array with ground isolated SC DC-DC converters as disclosed in the embodiments herein.

FIG. 2 illustrates a current equalization scheme of a PV array with ground isolated SC DC-DC converters as disclosed in the embodiments herein. The figure depicts the overall scheme for the SC converter based current equalization of 'n' PV modules that are connected in series to form a PV array. In an embodiment, current equalization using SC DC-DC converters connected across each PV module are used for extracting maximum power from partially shaded PV modules. Also, the method is applicable for uniformly illuminated PV modules as well. The input of the SC converter used for current equalization is connected to the output terminals AB of a step down converter 201 which in turn is powered from the output of the Array MPP tracker 101.

Further, the output of each SC converter is connected across a PV module. All the SC converters ranging from 1 to n−1 are of ground isolated topology whereas the $n^{th}$ SC converter is connected to the circuit ground. Each SC converter has a dedicated control circuit that precisely controls the voltage across its output terminals as well as the equalization current that is to be injected across the associated PV module. Also, dedicated MPP trackers 203 are associated with the PV modules 103 to ensure that each PV module 103 in the array operates at its MPP. Dedicated Pulse Width Modulation (PWM) based controls 202 aid each of the SC DC-DC converters for regulating the module voltage to $V_{iMPP}$ and injecting the corresponding equalization current of $I_{iF}$.

Figure 3A:
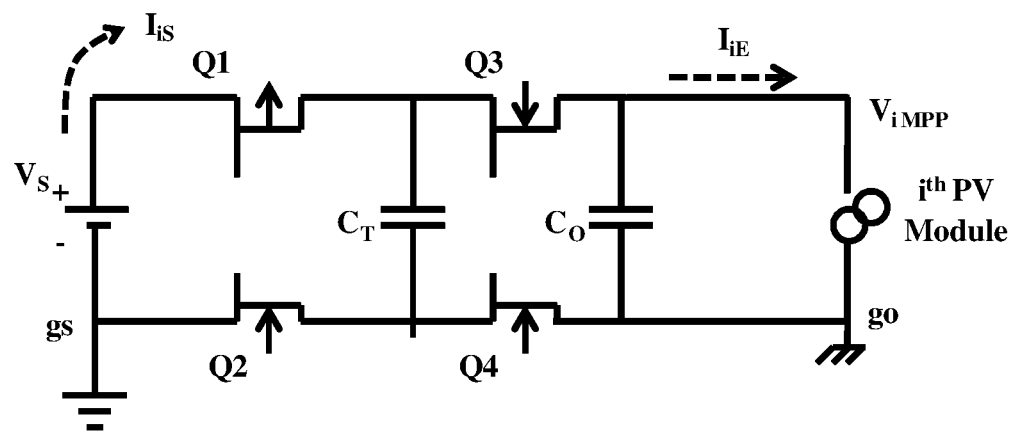
FIGS. 3a and 3b illustrates a ground isolated SC DC-DC converter, MOSFET drive and voltage across charge transfer capacitor (CT) as disclosed in embodiments herein.
Figure 3B:
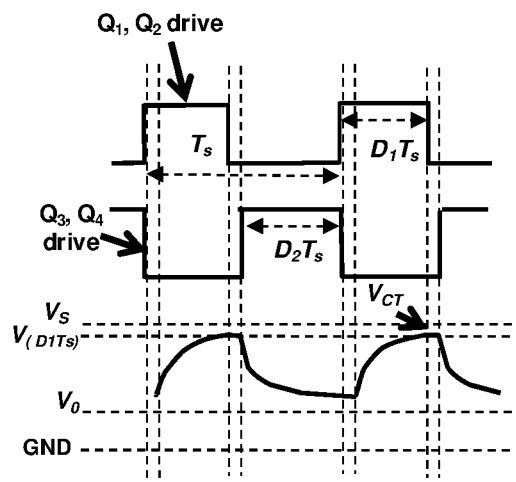

FIGS. 3a and 3b illustrate a ground isolated SC DC-DC converter, Metal-Oxide semiconductor field effect transistor (MOSFET) drive and voltage across the charge transfer capacitor (CT) as disclosed in embodiments herein. The FIG. 3a shows a ground isolated SC DC-DC converter whose output is connected across the $i^{th}$ PV module in a PV array consisting of n series connected PV modules. All MOSFETs except Q1 are n-channel. As shown in FIG. 3(b), D1 is the operating duty ratio of Q1 and Q2. D2 is the operating duty ratio of Q3 and Q4. The variable duty ratio of MOSFETs Q1 and Q2 is D1Ts. Q3 and Q4 are driven with a fixed ON time=D2Ts. Q1 and Q2 are turned ON in phase for duration D1Ts. Similarly Q3 and Q4 are turned ON in phase for D2Ts but in anti-phase with Q1 and Q2, i.e., the phase difference between Q1, Q2 and Q3, Q4 is equal to 180 degrees. Q3 and Q4 are driven by pulse transformers to maintain ground isolation. Thus the charge transfer capacitor $C_T$ is electronically switched between the source $V_S$ and output capacitor $C_O$ connected across the PV module. The switching sequence shown in FIG. 3(b), shows that the source ground $g_S$ is always isolated from the output ground $g_O$. The SC converter output is regulated to $V_{iMPP}$, which is the MPP voltage of the $i^{th}$ PV module. Thus the voltage across CO is regulated to $V_{iMPP}$. The voltage across CT is also shown in FIG. 3(b). V(D1Ts) is the value of the voltage across $C_T$ after a charging time D1Ts. $I_{iS}$ is the SC converter's input current in FIG. 3(a).

If $\Delta V_{iMPP}$ is the output ripple, $C_O$ and $C_T$ are given by:

$$C_O = \frac{I_{iE} \times t_1}{\Delta V_{iMPP}} \quad (6)$$

and $$C_T = \frac{\Delta Q}{V_S - V_{iMPP}} \quad (7)$$

where $$\Delta Q = (I_{iE} \times t_2) + C_O \times \Delta V_{iMPP} \quad (8)$$

If $t_1$ is the maximum ON time of $Q_1$ and $Q_2$ and if $t_2$ is the maximum ON time of $Q_3$ and $Q_4$, then $t_1+t_2=T_S$. $C_T$ may be expressed in terms of the output power $P_O$ and switching frequency $f_S=1/T_S$ as:

$$C_T = \frac{P_O}{(V_S - V_{iMPP}) \cdot V_{iMPP} \cdot f_S} \quad (9)$$

The voltage variations across CT is depicted in FIG. 3b where the MOSFETs Q1,Q2 are turned on in the duration D1TS and Q3,Q4 are turned on in the duration of D2TS but in anti-phase with Q1,Q2. The main loss in an SC converter is the capacitor charge up loss. In the buck topology of FIG. 3, the charge up loss is given by ½ $C_T$ $(\Delta V)^2$ where $\Delta V$ is the step change of the voltage across $C_T$. Further, the charge up loss in the buck type SC converter shown in FIG. 3a is minimized when $V_S-V_{iMPP}$ is minimized.

The SC converter maintains charge efficiency which implies that the charge put into $C_T$ during the charge up phase must be equal to the charge removed from it during the discharge phase. Since only one capacitor $C_T$ is involved in the charge-discharge process, $I_{iE}=I_{iS}$ for the topology shown in FIG. 3a. Thus the maximum efficiency η of the SC converter is:

$$\eta = \frac{V_{iMPP} \cdot I_{iE}}{V_S \cdot I_{iS}} = \frac{V_{iMPP}}{V_S} \quad (10)$$

From equation (10) it is evident that theoretically η≈100% efficiency when $V_S \approx V_{iMPP}$. Therefore, it is of utmost need to keep a minimum voltage differential between $V_S$ and $V_{iMPP}$. Further, the step down converter 201 ensures that the input output voltage differential of the SC converter is kept as low as possible by maintaining the input to the SC converter $V_S=V_{iMPP}+\partial V$ where $\partial V$ is a small voltage that is of minute value.

Let the step down converter of 201 have an efficiency $\eta_{SD}$ and let the current equalization SC converter have an efficiency $\eta_{SC}$. Now equation (3) has to be modified as shown below to account for the converter efficiencies.

$$P_T = P_{AMPP} = P_{AMPP} - P_{2E}/(\eta_{SD}\eta_{SC}) \quad (11)$$

Hence it is imperative that both $\eta_{SD}$ and $\eta_{SC}$ be as high as possible.

Figure 4:
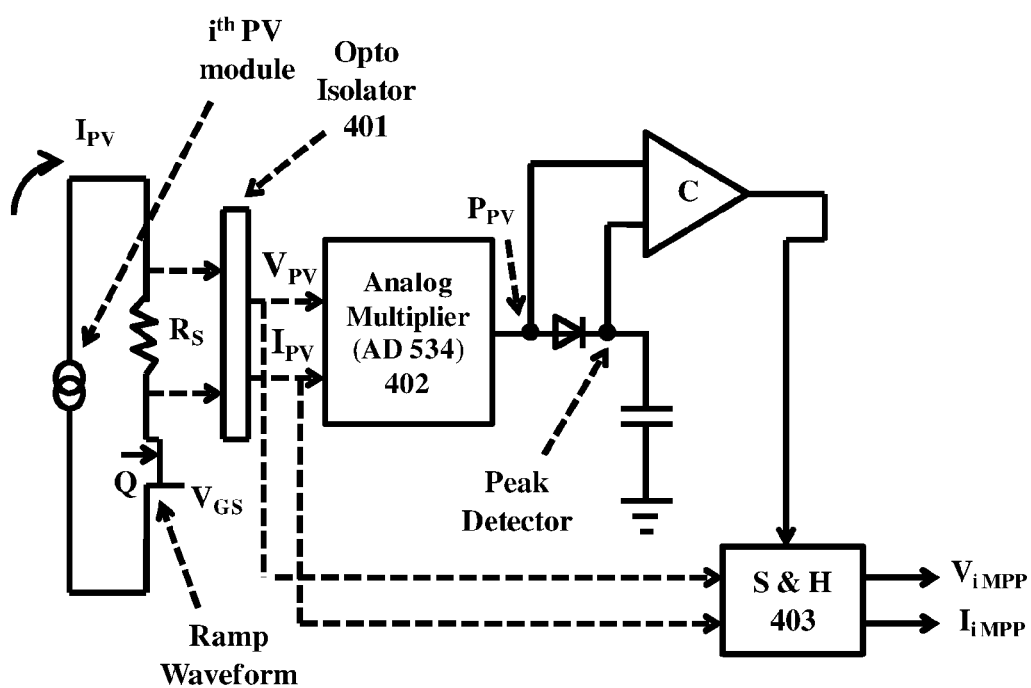
FIG. 4 illustrates PV module MPP tracker as disclosed in embodiments herein.

FIG. 4 illustrates PV module MPP tracker as disclosed in embodiments herein. Each PV module has its own MPP tracker that ensures that the module always operates at its MPP. The MPP voltage of a module can vary by about 15% with change in insolation level due to partial shading. $V_{GS}$ of MOSFET Q is a ramp that drives it from OFF to ON state through the active region. This takes the PV module from near short circuit to open circuit through the MPP. An Opto Isolator 401 provides the ground isolation between the PV module ground and control circuit ground. The module voltage $V_{PV}$ and current $I_{PV}$ (measured as the drop across $R_S=1\Omega$) are multiplied by the analog multiplier 402 to give the instantaneous module power $P_{PV}$ that increases monotonically to reach the peak and then decreases. This direction change is detected by comparator C and then used to latch the $i^{th}$ module's $V_{iMPP}$ and $I_{iMPP}$ with a sample and hold (S & H) 403 chip.

The power vs voltage ($P_A$ vs. $V_A$) characteristics of the PV array has a single power peak. Since the PV modules are series connected, the module voltages add up. The PV array has an MPP at $V_{AMPP}=\Sigma V_{iMPP}$.

The controller of the array MPP tracker is given an equivalent reference to ensure that the PV array is operated at this point which is the sum of the MPP voltages of individual modules, thus excluding the need for any kind of MPP tracking algorithm for the array MPP tracker. The process of determination of the MPP of a module may be performed in set time intervals and may be repeated in set time intervals. For example, the MPP determination may take 5 milliseconds and the process may be set to repeat during every four to five minutes. During the MPP determination, the PV array is disconnected from the load by opening a switch S through which it is connected to the Array MPP Tracker 101.

The SC converter of the $i^{th}$ PV module has to regulate the module voltage to $V_{iMPP}$ while injecting an equalization current $I_{iE}$ across the module.

In a PV array sometimes the $i^{th}$ PV module may be very poorly illuminated due to various factors such as lack of sunlight, exposure to dust and so on. Low illuminated modules make insignificant contribution to the load power. Now, $I_{iE} \approx I_{AMPP}$, where $I_{AMPP}$ is the PV array's current at the MPP. Sometimes the $i^{th}$ PV module may be brightly illuminated. ($I_{iE} \approx 0$). Under both these circumstances, the PV module voltage has to be maintained at $V_{iMPP}$. Thus the current equalization SC converter must be able to regulate its output at $V_{iMPP}$ for a large load current variation with PWM control. This is the process of control of the SC converter.

Figure 5A:
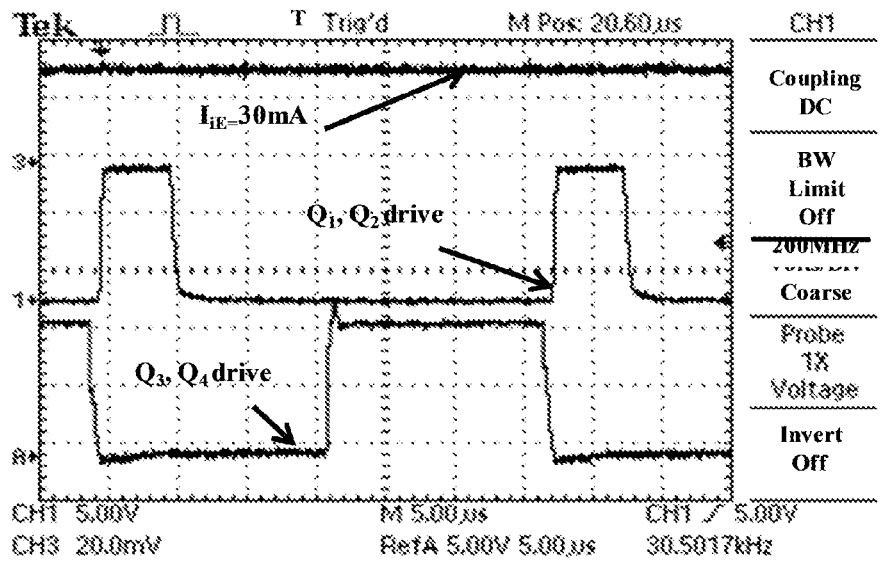
FIGS. 5a and 5b illustrates the experimental waveforms: variation of equalization current IE with change in operating duty ratio as disclosed in embodiments herein.
Figure 5B:
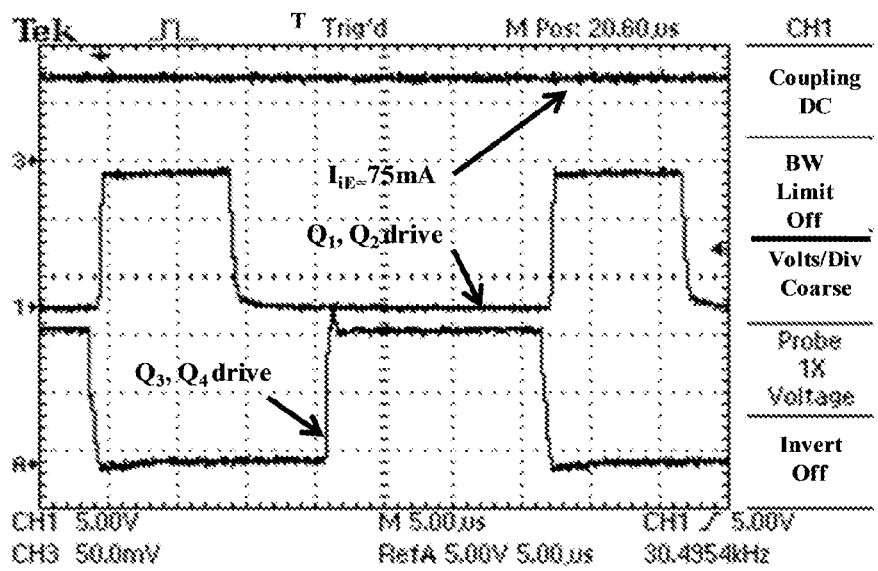

FIG. 5a and FIG. 5b illustrate the experimental waveforms with variation of equalization current IE with change in operating duty ratio as disclosed in the embodiments herein. FIGS. 5a and 5b show the variation of the equalization current IE with change in the ON time (=D1Ts) of the MOSFETs Q1 and Q2, Q3 and Q4 are driven with a fixed ON time equal (=D2Ts). It is shown that when D1Ts is increased, IE injected by the SC converter across the PV module increases and vice versa. For experimental analysis, two SC converters and two PV modules, each made of 20 numbers of series connected 4 cm×6 cm Si (silicon) solar cells were wired. A 1 kW halogen lamp was used to illuminate the modules. Partial shading was introduced on one of the modules. The FIGS. 5a and 5b respectively show the variation in the equalization current $I_E$ with change in duty ratio $D_1T_S$. Here $D_2T_S$ is fixed at 0.5 $T_S$.

Comparison of power generated with current equalization scheme and module bypass diode.

| $V_{Ampp}/2$ (V) | $I_{1mpp}$(A) | $P_{1mpp}$(W) | $I_{2mpp}$(A) | $P_{2mpp}$(W) | $I_{E1}$(A) | $I_{E2}$(A) | $P_T$(W) $\eta_{SC} = 0.95$ $\eta_{SD} \approx 1$ | $P_D$(W) |
|---|---|---|---|---|---|---|---|---|
| 8 | 0.2 | 1.6 | 0.15 | 1.2 | 0 | 0.05 | 2.77 | 1.5 |
| 8 | 0.2 | 1.6 | 0.17 | 1.36 | 0 | 0.03 | 2.95 | 1.5 |
| 8 | 0.1 | 0.8 | 0.2 | 1.6 | 0.1 | 0 | 2.36 | 1.5 |
| 8 | 0.18 | 1.44 | 0.2 | 1.6 | 0.02 | 0 | 3.0 | 1.5 |

The above table depicts the comparison of the power generated from a PV array made with two PV modules with an SC converter based current equalization scheme. Further, the power available ($P_T$) after current equalization and the power available with module by pass diodes ($P_D$) for various equalization currents is tabulated in Table 1. It is evident that $P_T$ is always larger than $P_D$.

Figure 6:
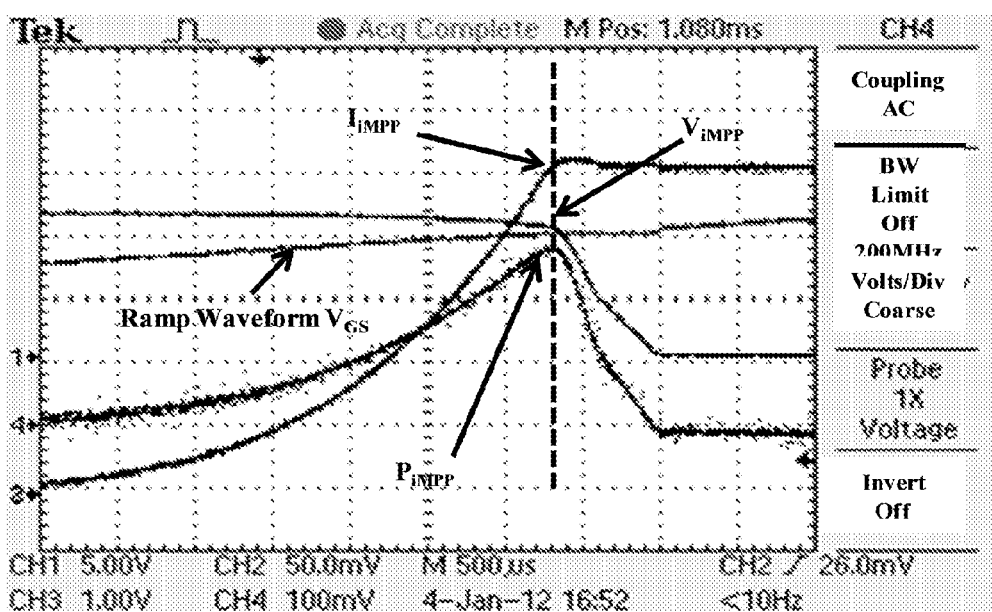
FIG. 6 illustrates the experimental waveforms of the PV module MPP tracker of FIG. 4 as disclosed in the embodiments herein.

FIG. 6 illustrates the experimental waveforms of the PV module MPP tracker of FIG. 4 as disclosed in the embodiments herein. VGS is the ramp shaped gate drive to MOSFET Q to make the PV module traverse its current-voltage characteristics. $I_{impp}$ and $V_{impp}$ are the MPP values of the PV module current and voltage that are indicated on the module current and voltage waveforms respectively. The MPP power $P_{impp}$ is shown on the power curve, wherein $P_{impp}$ is obtained by multiplying the PV module's instantaneous voltage and current with the analog multiplier.

Figure 7:
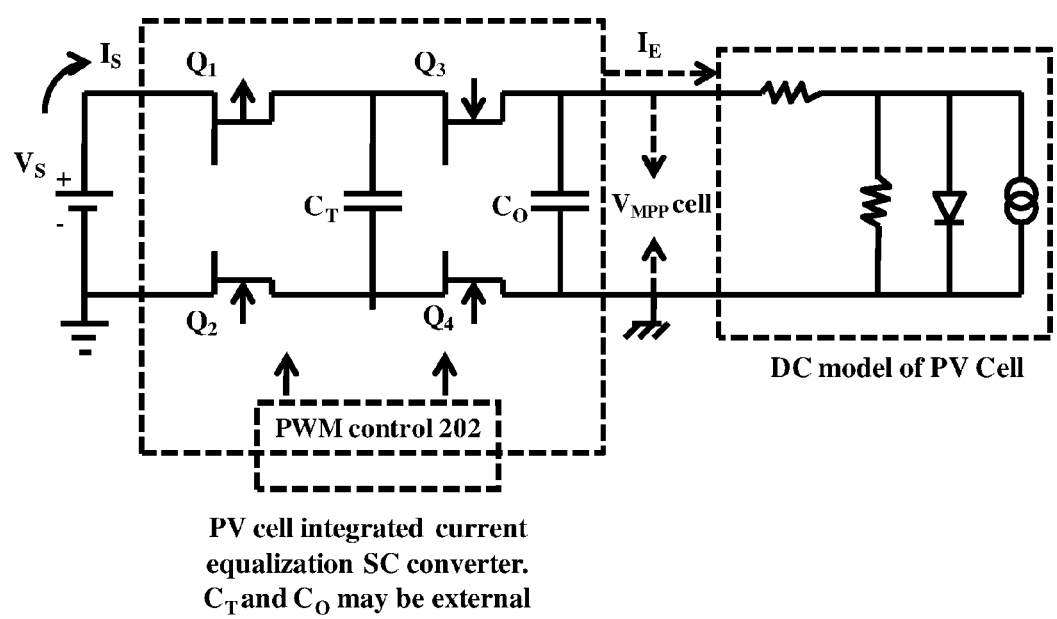
FIG. 7 illustrates a PV cell integrated current equalization SC converter as disclosed in embodiments herein.

FIG. 7 illustrates a PV cell integrated current equalization SC converter as disclosed in embodiments herein. The proposed current equalization scheme was experimentally verified for a PV module made with 20 numbers of series connected Silicon solar cells. However, this scheme may also be extended to the cell level. Miniaturized current equalization SC converters are connected across each PV cell. These SC converters may be realized on the same monolithic PV cell wafer itself. Further, the input power for current equalization is fed from an external source $V_S$. The control circuits and MOSFET switches are realized on the same wafer as the PV cell. The only external components would be the charge transfer and output capacitor.

Figure 8:
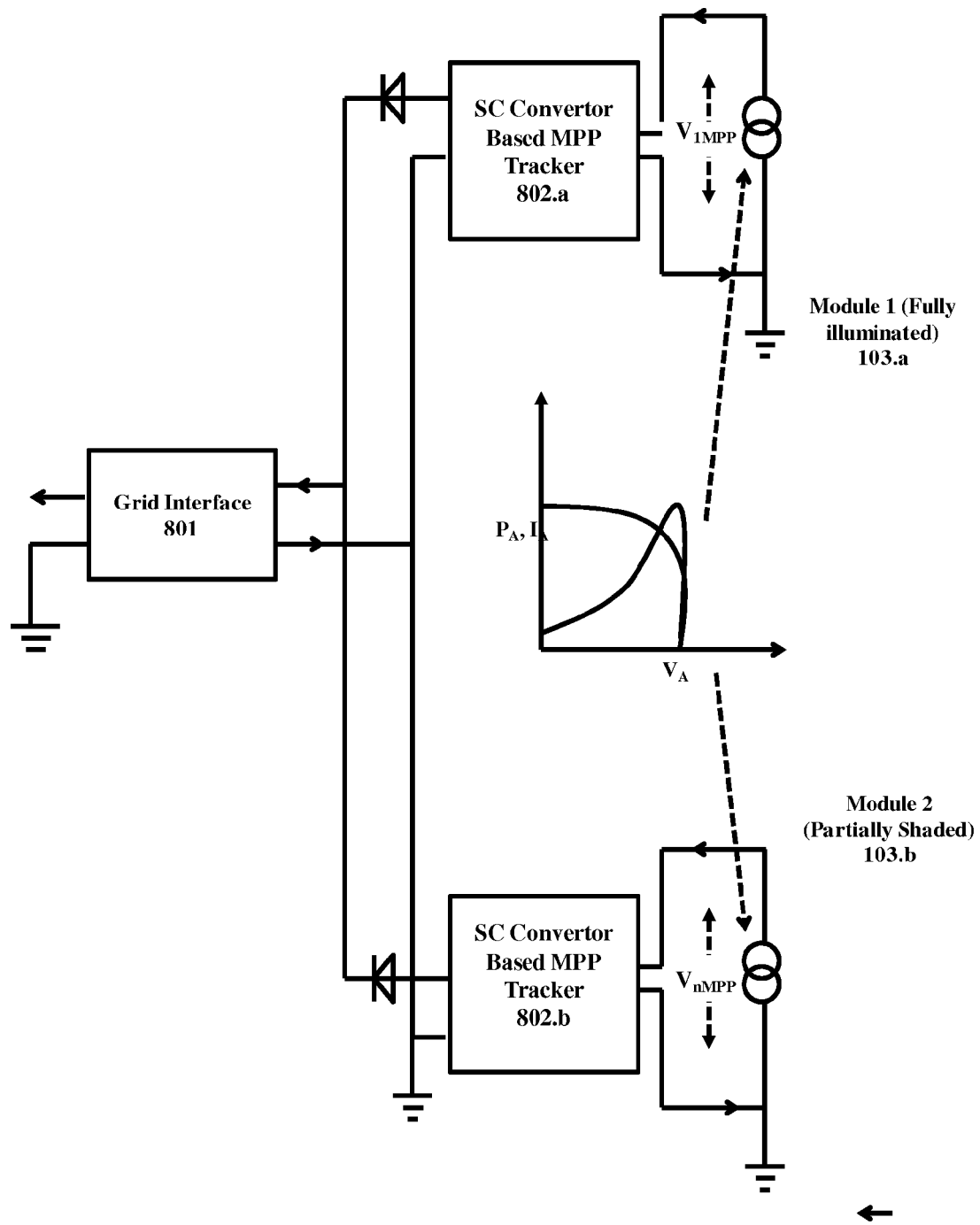
FIG. 8 illustrates another SC converter based DMPP tracking scheme as disclosed in embodiments herein.

FIG. 8 illustrates another SC converter based DMPP tracking scheme as disclosed in embodiments herein. There are n PV modules 103 where the negative terminals of all PV modules 103 are connected to a common ground. An SC converter 802 is connected across each PV module 103. Some of the PV modules 103 may be more illuminated than the other modules. The outputs of the SC converters 802 are diode ORed and connected to the input of a boost converter/inverter that forms the grid interface 801.

In order to extract maximum power from the PV module; say 103.a, it is necessary to operate the module at the MPP. At MPP, the PV module's 103.a output resistance is $R_{MPP}$. In case the electrical load $R_L$ is directly connected to the PV module, the operating point will deviate from the MPP since $R_{MPP} \neq R_L$.

Figure 9:
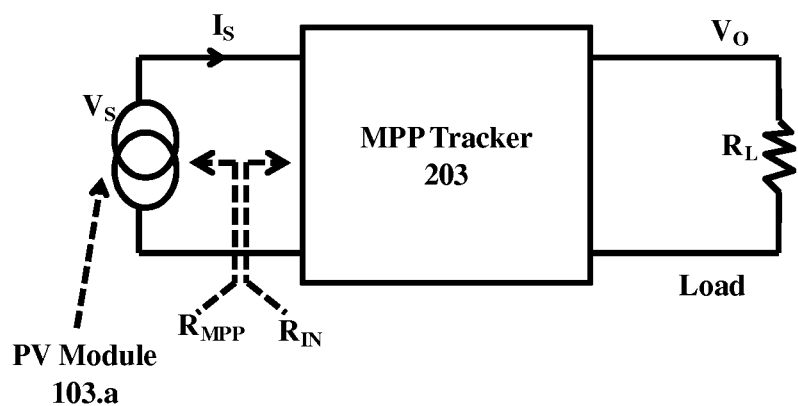
FIG. 9 illustrates load interfaced to PV module through an MPP tracker as disclosed in embodiments herein.

FIG. 9 illustrates load interfaced to PV module through an MPP tracker as disclosed in embodiments herein. An intermediate matching DC-DC converter called the MPP tracker 203 is shown in the figure is used to interface the PV module 103.a to the load such that:

$$R_{MPP} = 1/m = R_{IN} \quad (12)$$

where $R_{MPP}$ is the module's output resistance at MPP, $R_{IN}$ is the input resistance of the loaded intermediate DC-DC converter and m is the slope of the load line on the V-I curve at MPP.

By equation (12), it can be ensured that the module's MPP is tracked. Existing techniques to perform MPP tracking of a PV source are implemented with DC-DC converters. In the DMPP tracking scheme proposed here, SC converters are used for tracking the MPP of individual PV modules.

Further, the output voltage $V_O$ of all the MPP trackers is set to the same value where it is assumed that the illumination on every PV module is such that there is only one peak power point for that PV module. However, the peak power of the different PV modules may be different depending on the illumination. Any of the popular MPP tracking algorithms may be implemented for MPP tracking.

Figure 10:
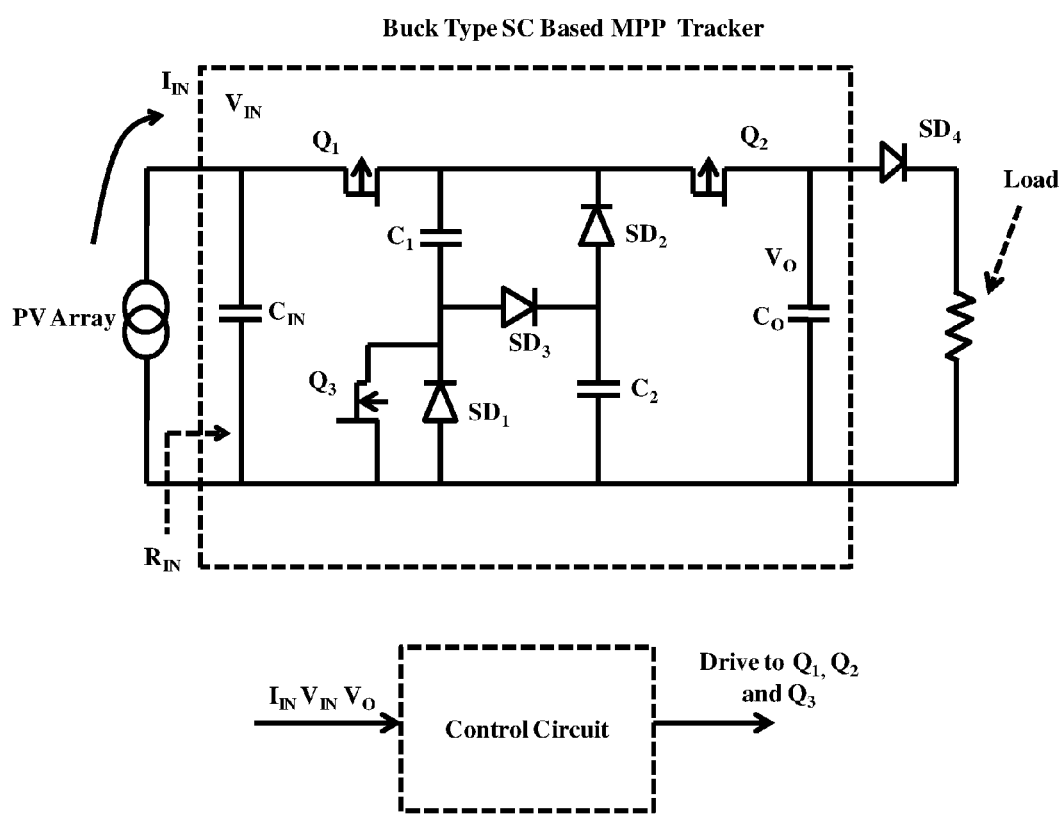
FIG. 10 illustrates a reconfigurable buck type SC converter based MPP tracker used for tracking the MPP of a PV source as disclosed in embodiments herein.

FIG. 10 illustrates a reconfigurable buck type SC converter based MPP tracker used for tracking the MPP of a PV source as disclosed in embodiments herein. The figure depicts a reconfigurable SC converter DMPP tracker proposed to reduce charge up losses in SC converters. $Q_1$ and $Q_2$ are p-channel MOSFETs whereas $Q_3$ is an n-channel MOSFET. If the MOSFET is a p-channel or p MOS FET, then the source and drain are 'p+' regions and the body is an 'n' region. If the MOSFET is an n-channel or n MOS FET, then the source and drain are 'n+' regions and the body is a 'p' region. Q1 is operated with a duty ratio $D_1$ such that $0 \leq D_1 \leq 0.45$ whereas $Q_2$ operates at a fixed duty ratio $D_2 = 0.45$. This ensures a dead time $t_D \geq 0.05TS$. $Q_3$ is an n-channel MOSFET that is permanently ON or OFF depending upon $V_{IN}$ and $V_O$.

$SD_1$ to $SD_4$ are Schottky diodes. Schottky diodes are semiconductor diodes with a low forward voltage drop and a very fast switching action. $C_1$ and $C_2$ are very low Equivalent Series Resistance (ESR) metalized polyester charge transfer capacitors ($C_1 = C_2$). ESR is the sum of all internal resistances of a capacitor measured in ohms.

Further, $C_{IN}$ and $C_O$ are the input and output capacitor banks respectively that are much larger than $C_1$ and $C_2$. The presence of $C_{IN}$ ensures a constant input voltage $V_{IN}$ to the SC converter. A resistive load is connected to the output of the SC converter.

Unlike, SC converters operating from voltage sources like batteries where the variation in $V_{IN}$ is limited, PV array fed SC converters have to operate over a wide input voltage range arising out of varying I-V characteristics of the PV source due to varying intensities of solar radiation. In the above mentioned DMPP tracking scheme, since the entire power from the PV array has to be processed by the SC converter performing DMPP tracking, its efficiency has to be as high as possible. In a preferred embodiment, the system may be operated in different modes and the mode in which the system has to operate may be based on intensity level of the solar radiation. The different operation modes are:

Operating Mode 1:—

The system may be made operate in Operating mode 1 when the intensity of solar radiation is high. When solar radiation is of high intensity, the MPP voltage ($V_{MPP}$) of the PV module may be such that $V_O < \frac{1}{2}V_{IN}$. $Q_3$ is set OFF to initiate mode 1 operation. Initially $Q_1$ turns ON, serially charging $C_1$ and $C_2$ through $SD_3$. Thus the effective charge transfer capacitance is $C_1/2 = C_2/2$. $Q_1$ then turns OFF and $Q_2$ turns ON after a predefined dead time. Now $C_1$ and $C_2$ are connected in parallel through $SD_1$ and $SD_2$ and they discharge into $C_O$ and the battery through the blocking diode $SD_4$. This mode of operation ensures that $\Delta V$ is small resulting in higher efficiency even though the input-output voltage differential is large.

Operating Mode 2:—

The system may be made operate in operation mode 2 when intensity of the solar ray is low. When solar radiation intensity is low, the VMPP of the PV module may be such that $V_O \geq \frac{1}{2}V_{IN}$. In such situations, $Q_3$ is permanently turned ON to initiate mode 2 operation. Now the effective charge transfer capacitance is $C_1$ and it is charged and discharged when $Q_1$ and $Q_2$ are switching. $C_2$ is now electrically isolated and plays no part in the charge transfer from source to load. Hence $V_O$ may be $\geq \frac{1}{2}V_{IN}$ during operation in mode 2. Thus the limitation of a restricted input voltage range observed with mode 1 operation alone is eliminated. Also, the efficiency is acceptable since the input-output voltage differential is not high except in the region of $V_O \approx \frac{1}{2}V_{IN}$. The input resistance $R_{IN}$ of the SC converter MPP tracker for mode 2 operation is given by $$R_{IN} = \frac{V_{IN}}{I_{IN}} = \frac{1}{C_T \cdot f_S \cdot (1-k) \cdot \left(1 - e^{\frac{-D_1}{f_S \tau_1}}\right)} \quad (13)$$

For mode 1, $R_{IN}$ is given by $$R_{IN} = \frac{V_{IN}}{I_{IN}} = \frac{1}{C_T \cdot f_S \cdot (1-k) \cdot \left(1 - e^{\frac{-D_1}{f_S \tau_1}}\right)} \quad (14)$$

Where $$k = V_O / V_{IN} \quad (15)$$

Here, $\tau_1 = R_1 \cdot C_T$ (in mode 2) and $\tau_1 = R_1 \cdot \frac{1}{2}C_T$ (in mode 2), where $R_1$ is the input circuit parasitic resistance. (parasitic extraction is calculation of the parasitic effects in both the designed devices and the required wiring interconnects of an electronic circuit: detailed device parameters, parasitic capacitances, parasitic resistances and parasitic inductances, commonly called parasitic devices, parasitic components, or simply parasitic) $R_{IN}$ of the SC converter MPP tracker is adjusted by PWM to match $R_{MPP}$ of the module. More operating modes may be introduced to improve the efficiency by reducing charge up losses over a wide operating range.

Figure 11A:
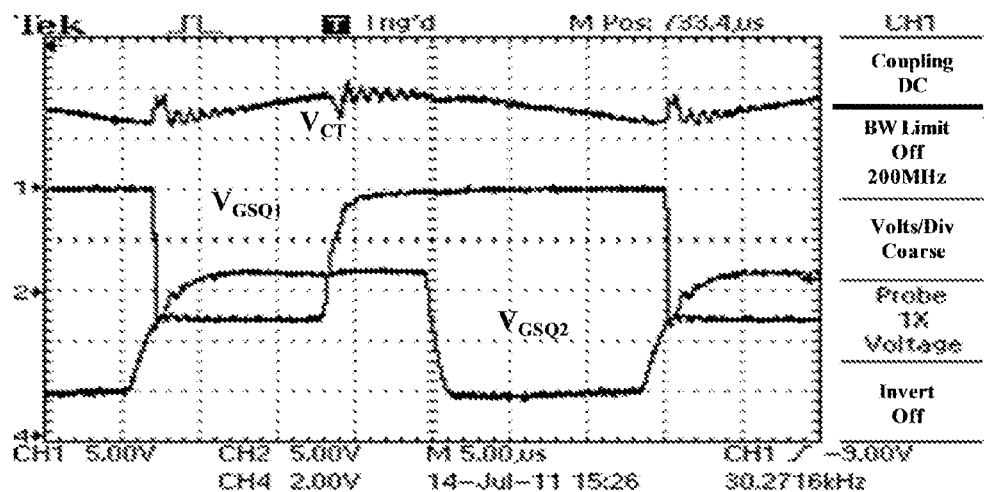
FIGS. 11a and 11b illustrates experimental waveforms as disclosed in embodiments herein.
Figure 11B:
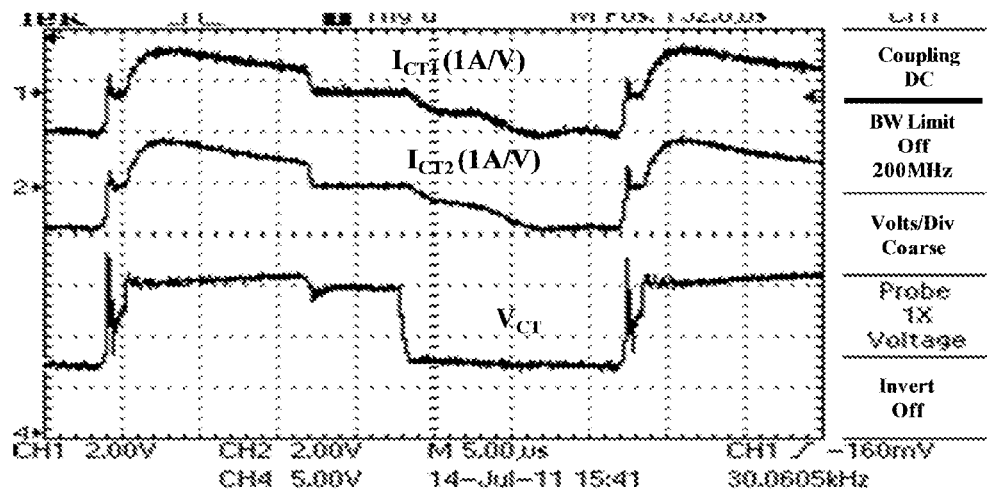

FIGS. 11a and 11b illustrates experimental waveforms as disclosed in embodiments herein. FIG. 11(a) depicts the drive signals to the MOSFETs $Q_1$ and $Q_2$ ($V_{GS} Q_1$ and $V_{GS} Q_2$) and the charge transfer capacitor voltage waveform ($V_{CT}$) in mode 2 operation with $V_O=12V$. FIG. 11(b) depicts the current waveforms through both the charge transfer capacitors ($I_{CT1}$ and $I_{CT2}$) and voltage waveform ($V_{CT}$) across the charge transfer capacitors in mode 1.

A 10 W SC dc-dc converter is designed to track the MPP of a PV module whose $V_{MPP}$ varies in the range $9V \leq V_{MPP} \leq 16V$ during periods of partial shading and uniform illumination. Substituting $P_O=10$ W, $\Delta V=3V$ (which ensures a minimum differential of 3V between $V_O$ and $V_{IN}$), $f_S=30$ kHz and $V_{OMIN}=4V$ in (9) gives $C_T=C_1=C_2 \approx 33$ μF $C_1$ and $C_2$ are metalized polyester capacitors (Euro Farad PM90R1S) with high ripple current ratings and a very low ESR of $\approx 4$ mΩ at 30 kHz. Referring to FIG. 10, $Q_1$ (IRF 9630, $R_{DSON}=0.8\Omega$, $I_{DSMAX}=6.5$ A) and $Q_2$ (IRHMS 597160, $R_{DSON}=50$ mΩ, $I_{DSMAX}=45$ A) are p-channel MOSFETs. To reduce the effective $R_{DSON}$ of $Q_2$, four such MOSFETs are paralleled so that the effective $R_{DSON} \approx 12$ mΩ. Subject to availability, a single very low $R_{DSON}$ p-MOSFET (like Vishay's SUM110P06-08L, $R_{DSON}=8$ mΩ) may be used.

$Q_3$ (IRHSNA 57064, $R_{DSON}=6$ mΩ, $I_{DSMAX}=75$ A) is an n-channel MOSFET of very low $R_{DSON}$. Diodes $SD_1$ to $SD_4$ are Schottkey diodes (1N 5822). $C_{IN}=200$ μF and $C_O=47$ μF are Tantalum electrolytic capacitors. $C_{IN}$ ensures a constant voltage $V_{IN}$ to the SC converter. A tantalum capacitor is a type of electrolytic capacitor, a component of electronic circuits. It typically consists of a pellet of tantalum metal as anode, covered by an insulating oxide layer that forms the dielectric, surrounded by conductive material as a cathode. Tantalum capacitors are the main use of the element tantalum. The tantalum capacitor distinguishes itself from other capacitors in having high capacitance per volume and weight. Tantalum capacitors have lower equivalent series resistance (ESR), lower leakage, and higher operating temperature than other electrolytic capacitors.

Figure 12A:
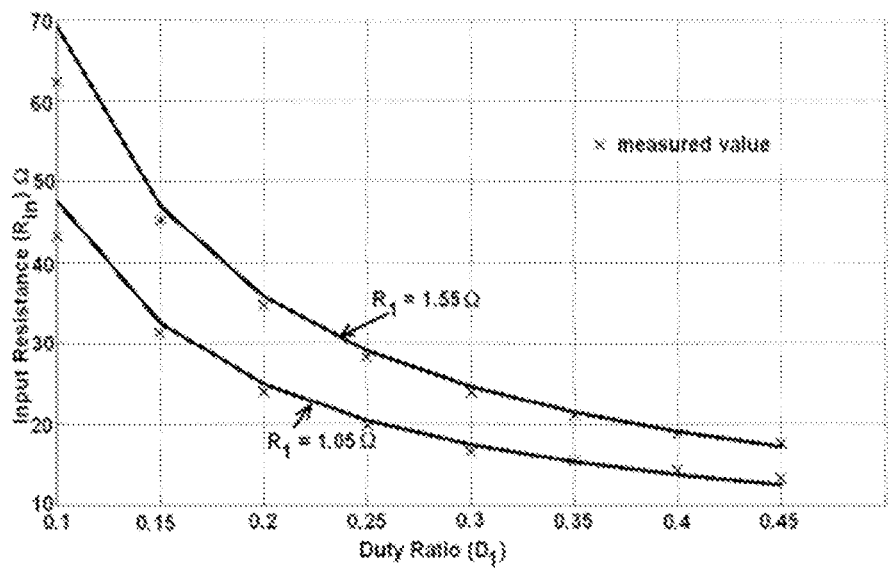
FIGS. 12a and 12b illustrates a comparison of theoretical and experimental results as disclosed in embodiments herein.
Figure 12B:
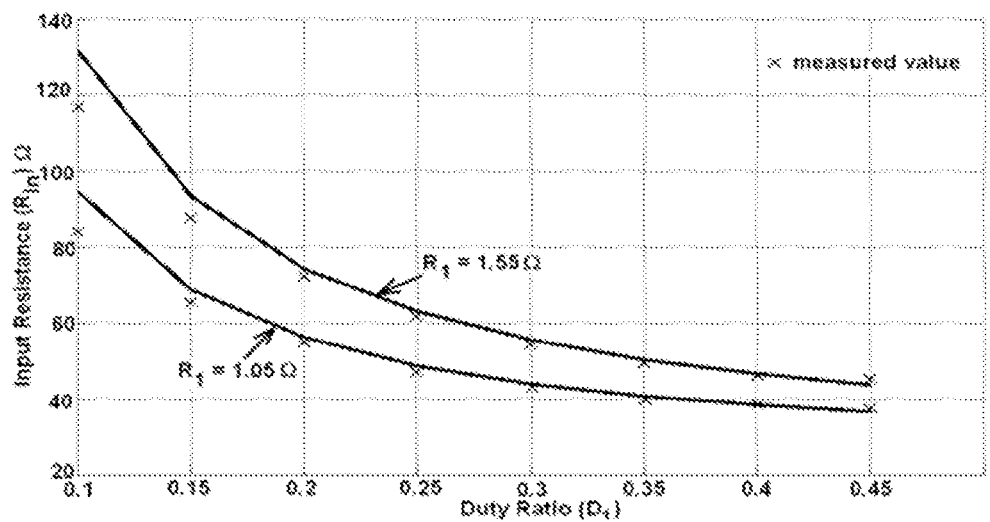

FIGS. 12a and 12b illustrates a comparison of theoretical and experimental results as disclosed in embodiments herein. The Figures depict a comparison of the theoretical and practical values of the input resistance $R_{IN}$ for different duty ratios.

FIG. 12a depicts the comparison of theoretical and experimental results (PWM, mode 2): CT=33 μF, R1=1.05Ω and 1.55Ω, k=0.77, fS=30 kHz, 0.1≤D1≤0.45. FIG. 12b depicts the comparison of theoretical and experimental results (PWM, mode 1): CT=16.5 μF, R1=1.05Ω and 1.55Ω and k=0.43, fS=15 kHz, 0.1≤D1≤0.45.

Two similar SC converters with the above mentioned specifications were wired and interfaced to two tunable PV module simulators. MPP tracking was done with the Perturb and Observe algorithm. In the Perturb and observe method, the controller varies the PV array voltage by a small amount and measures power. If the power increases, further adjustments in that direction are tried until power oscillates about the MPP.

The outputs of the SC converters are diode ORed and connected to a common resistive load. The P-V characteristics of the simulator were varied and the MPP tracking was verified. Table 2 shows some of the experimental results of SC Converter Based DMPP Tracker's efficiency for different operating conditions.

| Mode | $V_{in}$ (V) | $I_{in}$ (A) | $P_{in}$ (W) | $V_o$ (V) | $I_o$ (A) | $P_o$ (W) | $\eta$ |
|---|---|---|---|---|---|---|---|
| 1 | 16.5 | 0.33 | 5.44 | 6.5 | 0.66 | 4.29 | 79.0 |
|   | 16   | 0.33 | 5.28 | 6.5 | 0.66 | 4.29 | 81.37 |
|   | 13   | 0.45 | 5.85 | 5.0 | 0.9  | 4.52 | 77.3 |
|   | 11   | 0.45 | 4.95 | 4.5 | 0.9  | 4.06 | 82.2 |
| 2 | 15   | 0.65 | 9.7  | 12  | 0.64 | 7.78 | 80.2 |
|   | 9.2  | 0.63 | 5.8  | 7   | 0.64 | 4.44 | 76.7 |
|   | 14   | 0.75 | 10.5 | 10  | 0.76 | 7.6  | 72.3 |

Conventional DC-DC converter based DMPP schemes were reported earlier. In the current invention, SC DC-DC converter based DMPP schemes are introduced. The bulkiest components in conventional DC-DC converters are the inductor and transformer coils. Since SC converters do not contain power handling coils, they are very compact. SC converters have very high conversion efficiency under certain operating conditions. The absence of power handling magnetics makes large scale manufacturing easier and more economical. They can be integrated into the PV module or PV cell during the manufacturing process.

Figure 13:
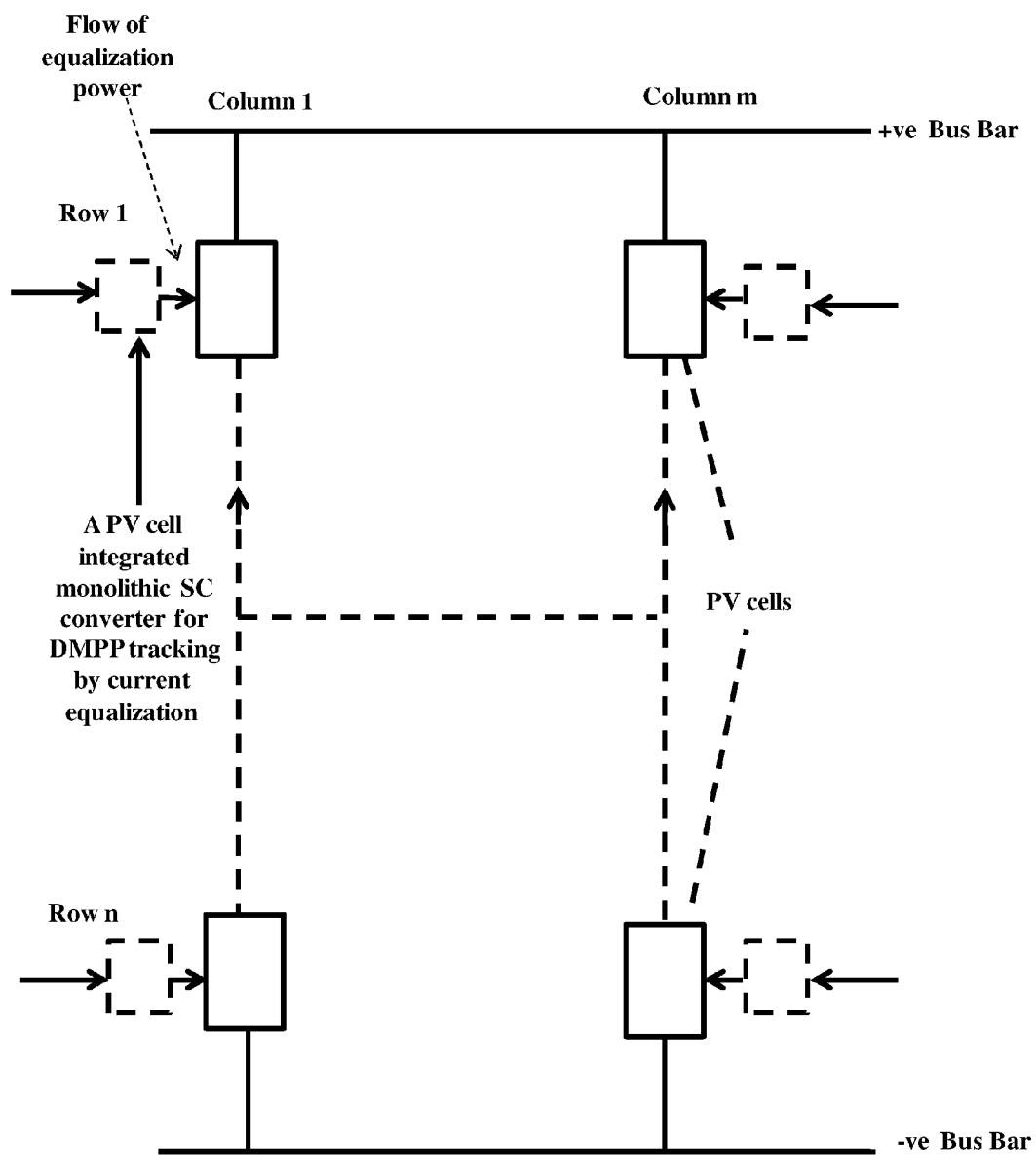
FIG. 13 illustrates the implementation of DMPP tracking with SC converter based current equalization for each PV cell as disclosed in embodiments herein.

FIG. 13 illustrates the implementation of DMPP tracking with SC converter based current equalization for each PV cell as disclosed in embodiments herein. The figure shows the case where DMPP tracking with current equalization is realized with SC converters integrated into the monolithic wafer containing the PV cell itself.

Figure 14:
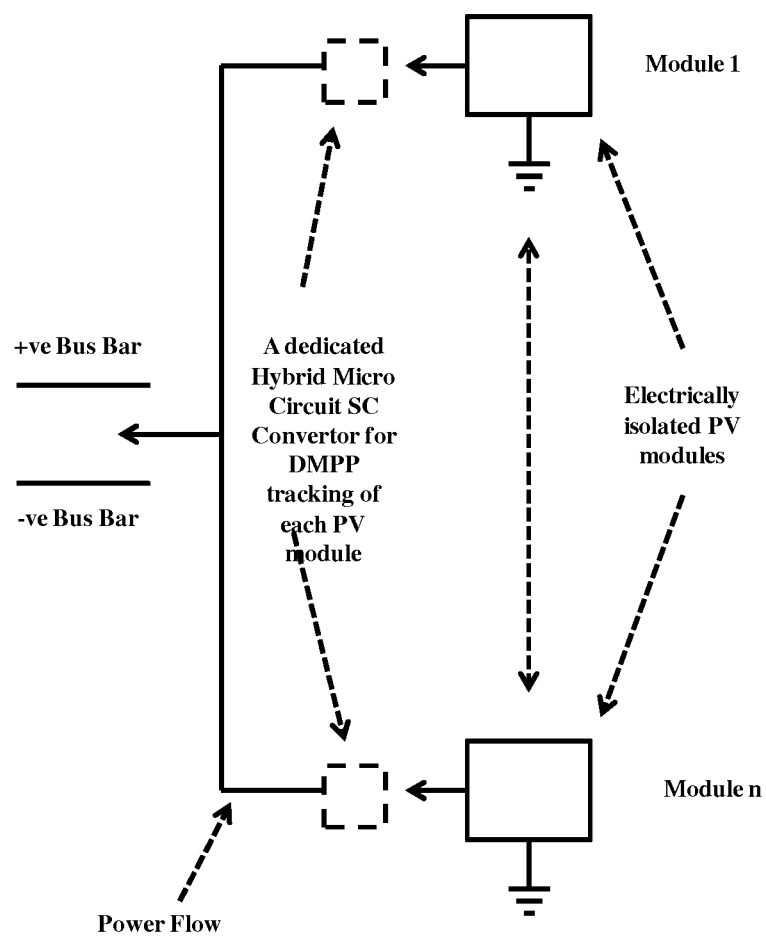
FIG. 14 illustrates the implementation of DMPP tracking with module dedicated SC converter based MPP tracker as disclosed in embodiments herein.

FIG. 14 illustrates the implementation of DMPP tracking with module dedicated SC converter based MPP tracker as disclosed in embodiments herein. The figure shows that hybrid micro circuit technology may be used to realize module integrated DMPP tracking SC converters for n isolated PV modules. Here a hybridized SC converter is used as a module dedicated MPP tracker.

The present embodiment does not require any form of tuning, they are ideal for large scale production. PV modules with SC converter based DMPP tracking schemes find use in applications where partial array shading is encountered. They are also ideal for use with PV modules mounted on contoured surfaces or applications with large thermal gradients. DMPP tracking schemes allow the user to interconnect together PV modules with varying current-voltage characteristics sparing the user the trouble of matching the module current-voltage characteristics. Also, DMPP tracking allows a modular approach to PV based power generation and improves system reliability. The DMPP tracking schemes ensure that the P-V characteristics of the PV system have only a single power peak as compared to multiple power peaks characteristic of partially shaded PV arrays. This simplifies the MPP tracking algorithm that needs to be implemented.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein describes a method and system for DMPP based on the current equalization scheme implemented with ground isolated SC DC-DC converters.

Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiment may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:
1. A method for implementing Distributed Maximum Power Point (DMPP) tracking schemes for a Photo Voltaic (PV) array, wherein the method uses Switched Capacitor (SC) DC (Direct Current)-DC (Direct Current) converters, wherein the method comprises:
   connecting a dedicated SC DC-DC converter across one of:
      each PV module of a PV string, wherein the PV array comprises a plurality of PV strings connected in parallel, the PV strings each comprise series connected PV modules and the PV modules each comprise a plurality of PV cells connected in series, wherein each dedicated SC DC-DC converter injects an equalization current across each PV module, wherein total current flowing through a parallel combination of each PV module and the corresponding dedicated SC DC-DC converter is equal to maximum current that can be produced by the PV string, and
      each PV cell of a PV string, wherein the PV array comprises a plurality of PV strings connected in parallel and the PV strings each comprise a plurality of PV modules connected in series, wherein each dedicated SC DC-DC converter injects an equalization current across each PV cell such that the total current flowing through a parallel combination of each PV cell and the corresponding SC DC-DC converter is equal to the maximum current that can be produced by the PV string.

2. The method, as claimed in claim 1, wherein each dedicated SC DC-DC converter maintains the voltage across each corresponding PV module to be Maximum Power Point (MPP) voltage of the PV module.

3. The method as claimed in claim 1, wherein each dedicated SC DC-DC converter maintains the voltage across each corresponding PV cell to be Maximum Power Point (MPP) voltage of that cell.

4. A Photo Voltaic (PV) array using a Distributed Maximum Power Point (DMPP) tracking scheme, wherein the PV array uses Switched Capacitor (SC) DC (Direct Current)-DC (Direct Current) converters, wherein the PV array comprises:
   a dedicated SC DC-DC converter connected across one of:
      each PV module of a PV string, wherein the PV array comprises a plurality of PV strings connected in parallel, the PV strings each comprise of a plurality of PV modules connected in series and the PV modules each comprise of a plurality of PV cells connected in series, wherein each dedicated SC DC-DC converter is configured for injecting an equalization current across each PV module, wherein total current flowing through a parallel combination of each PV module and the corresponding dedicated SC DC-DC converter is equal to the maximum current that can be produced by the PV string, and
      each PV cell of a PV string, wherein the PV array comprise a plurality of PV strings connected in parallel and the PV strings each comprise a plurality of series connected PV modules, wherein each dedicated SC DC-DC converter injects an equalization current across each PV cell such that the total current flowing through a parallel combination of each PV cell and the corresponding SC DC-DC converter is equal to the maximum current that can be produced by the PV string.

5. The PV array, as claimed in claim 4, wherein each dedicated SC DC-DC converter is configured for maintaining voltage across each corresponding PV module to be Maximum Power Point (MPP) voltage of the PV module.

\* \* \* \* \*